United States Patent
Faibish et al.

(10) Patent No.: US 7,672,981 B1
(45) Date of Patent: Mar. 2, 2010

(54) OBJECT CLASSIFICATION AND INDEXING OF VERY LARGE NAME SPACES USING GRID TECHNOLOGY

(75) Inventors: Sorin Faibish, Newton, MA (US); William Whitney, Marlborough, MA (US); Per Brashers, Oakland, CA (US); Gerald E. Cotter, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 271 days.

(21) Appl. No.: 11/680,618

(22) Filed: Feb. 28, 2007

(51) Int. Cl.
G06F 17/30 (2006.01)
(52) U.S. Cl. .................................................. 707/204
(58) Field of Classification Search .................. 707/1, 707/3, 100, 200, 204; 714/6, 14
See application file for complete search history.

(56) References Cited

U.S. PATENT DOCUMENTS

| | | | |
|---|---|---|---|
| 5,893,140 A | 4/1999 | Vahalia et al. | |
| 6,321,219 B1 * | 11/2001 | Gainer et al. | 707/3 |
| 6,324,581 B1 | 11/2001 | Xu et al. | |
| 6,353,878 B1 | 3/2002 | Dunham | |
| 6,389,433 B1 | 5/2002 | Bolosky et al. | |
| 6,477,544 B1 | 11/2002 | Bolosky et al. | |
| 7,277,899 B1 * | 10/2007 | Salyzyn | 707/200 |
| 2005/0149749 A1 | 7/2005 | Van Brabant | |
| 2005/0193245 A1 | 9/2005 | Hayden et al. | |
| 2006/0212746 A1 | 9/2006 | Amegadzie et al. | |
| 2006/0259813 A1 * | 11/2006 | Ushijima | 714/6 |

OTHER PUBLICATIONS

Rauber et al., Exploiting Multiple Levels of Parallelism in Scientific Computing, 2005, Springer Boston, vol. 172/2005, pp. 3-19.*
Chen et al., Automated Discovery of Patient-Specific Clinician Information Needs Using Clinical Information System Log Files, 2003, AMIA, pp. 145-149.*
William J. Bolosky, et al., "Single Instance Storage in Windows 2000," USENIX Technical Program, WinsSys, Aug. 3-4, 2000, Seattle, WA, USENIX, Berkeley, CA,12 pages.
"Secure Hash Standard," Federal Information Processing Standards Publication 180-2, Aug. 1, 2002, National Institute of Standards and Technology (NIST), Gaithersburg, MD, 75 pages.

(Continued)

*Primary Examiner*—Fred I Ehichioya
(74) *Attorney, Agent, or Firm*—Richard Auchterlonie; Novak Druce & Quigg, LLP

(57) ABSTRACT

For migration or de-duplication of a file system having a large number of files, a utility program traverses the file system to create a log of file-specific information about the file system. For identification of duplicates, the utility program produces a signature for each file. Respective instances of the utility program are started on multiple nodes upon which the file system is mounted. A fully qualified pathname is compiled during transfer of the log to a database. Multiple databases can be produced for the file system such that each database contains the file-specific information for a specified range of inode numbers. The database also maintains classification state for each file. For example, for a migration or replication process, the classification state identifies whether or not the file has been untouched, copied, linked, secondary-ized, source deleted, or modified.

15 Claims, 9 Drawing Sheets

OTHER PUBLICATIONS

Brian Babineau, "Symantec Enterprise Vault and EMC Centera—Unlocking the Benefits of Efficient Information Archiving," Enterprise Strategy Group, Milford, MA, Jan. 2007. 11 pages.

Henry Baltazar, "Microsoft's Single Instance Storage vs. Deduplication," Inside eWEEK Labs, eweek.com, Ziff Davis Internet, Woburn, MA Jan. 25, 2006, 3 pages.

Jerome M. Wendt, "Tech Report: Content-addressed storage preferred for fixed-content storage," searchstorage.com, Needham, MA, Jun. 19, 2006, 5 pages.

"Single Instance Store and SIS Backup," msdn2.microsoft.com, Microsoft Corporation, Redmond, WA, printed Jan. 25, 2007.

D. T. Liu and M. J. Franklin, "GridDB: A Data-Centric Overlay for Scientific Grids," Technical Report UCB//CSD-04-1311, University of Calavornia Berkeley, Berkeley, CA, Mar. 16, 2004 15 pages.

Uresh Vahalia, Unix Internals: The New Frontiers, Chapter 9, "File System Implementations," Prentice-Hall, Inc., New Jersey, 1996, p. 261-289.

BerkeleyDB Core Package, Sleepycat Software, Oracle, Redwood Shores, CA, printed May 25, 2005, 8 pages.

* cited by examiner

OBJECT CLASSIFICATION AND INDEXING OF VERY LARGE NAME SPACES USING GRID TECHNOLOGY

LIMITED COPYRIGHT WAIVER

A portion of the disclosure of this patent document contains computer code listings and command formats to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

FIELD OF THE INVENTION

The present invention relates generally to management of information stored in a data processing system. In particular, the present invention relates to classification and indexing of files in a large namespace.

BACKGROUND OF THE INVENTION

In recent years, the data storage industry has been immensely successful in providing ever increasing amounts of data storage at decreased cost. This has permitted customers to keep vast numbers of business and technical documents in data storage for convenient access. Unfortunately it has also permitted software vendors to sell applications that generate many electronic documents that have identical or virtually identical content. These applications not only waste storage space but also waste processing time and reduce primary cache efficiency when multiple copies are recalled from storage pursuant to a search. For example, the Microsoft Outlook™ electronic mail system ordinarily results in multiple copies of an attachment being kept in data storage of a business enterprise when a document is sent by electronic mail to multiple recipients in the business enterprise.

In an attempt to solve the problem of multiple copies of a file being kept in a storage volume, Microsoft Corporation introduced a Single Instance Storage (SIS) feature in its Microsoft Windows® 2000 server. See William J. Bolosky, "Single Instance Storage in Windows® 2000," USENIX Technical Program, WinsSys, Aug. 3-4, 2000, Seattle, Wash., USENIX, Berkeley, Calif. SIS uses links to the duplicate file content and copy-on-close semantics upon these links. SIS is structured as a file system filter driver that implements the links and a user level service that detects duplicate files and reports them to the filter for conversion into links.

SIS, however, will not reduce the data storage requirements or performance degradation due to virtually identical files. For example, an E-mail application such as the Microsoft Outlook™ electronic mail system may produce virtually identical files in a business enterprise when an E-mail is sent to multiple recipients in the business enterprise. Data de-duplication techniques similar to SIS have been developed for reducing the data storage requirements of virtually identical files. These data de-duplication techniques determine file segments that are identical among virtually identical files, so that the data content of each shared file segment need be stored only once for the virtually identical files. The shared data content is placed in a common storage area, and each identical segment is removed from each of the virtually identical files and replaced with a corresponding link to the shared data content.

Because customers have kept vast numbers of business and technical documents in data storage for convenient access, many customers have been surprised by the cost of producing their electronic documents for regulatory compliance and for responding to discovery requests in litigation. For regulatory compliance, electronic document retention techniques have been developed so that critical documents are retained in disk storage until a specified expiration time.

SIS, de-duplication, and electronic document retention techniques are specific examples of information lifecycle management (ILM) strategies to facilitate efficient storage and selective recall of electronic business and technical documents. Many of these techniques involve classification and indexing of information in the electronic documents.

SUMMARY OF THE INVENTION

A problem with ILM occurs when a business enterprise with a vast number of electronic documents would like to put ILM in place for the first time without significant disruption to ongoing data processing operations. The classification and indexing for ILM requires considerable processing time for access to a large namespace in file system directories and for access to document content. This problem can be solved by executing instances of a utility program on multiple host processors to traverse respective subdirectory trees of the file system to collect file-specific information prior to putting ILM in place.

In accordance with one aspect, the invention provides a method of storage or retrieval of computer data. The computer data is contained in files of a file system in electronic data storage. The file system further includes a hierarchy of directories of the files. The method includes concurrently executing respective instances of a utility program on multiple host processors to traverse respective subdirectory trees of the hierarchy of directories of the files in order to collect, in at least one log, file-specific information of files in the file system; and then, when storing or recalling computer data of a file in the file system, accessing the file-specific information of the file from the at least one log to facilitate the storing or recalling of the computer data of the file in the file system.

In accordance with another aspect, the invention provides a method of storage or retrieval of computer data. The computer data is contained in files of a file system in electronic data storage. The file system further includes a hierarchy of directories of the files. The method includes executing a utility program with a first data processor to traverse at least a subdirectory tree of the hierarchy of directories of the files in order to collect, in a log, file-specific information about files in the subdirectory tree; and then transferring the file-specific information for a specified range of inode numbers from the log to a database; and then accessing the database with a second data processor when storing or recalling computer data of a file having an inode number in the specified range of inode numbers.

In accordance with yet another aspect, the invention provides a data processing system including electronic data storage containing a file system, and multiple data processors coupled to the electronic data storage for access to the file system. The file system includes files and a hierarchy of directories of the files. Each of the data processors is programmed for executing a respective instance of a utility program to traverse an assigned subdirectory tree of the hierarchy of directories of the files in order to collect, in a respective log, file-specific information about files in the subdirectory tree. In addition, each of the data processors is programmed for transferring, from the logs to a respective database, the file-specific information for a specified range of inode numbers assigned to each of the data processors. Moreover, each of the data processors is programmed for accessing, from the respective database, the file-specific information for the specified range of inode numbers in order to facilitate storage or retrieval of computer data of files of the file system having inode numbers within the specified range of inode numbers assigned to each of the data processors.

BRIEF DESCRIPTION OF THE DRAWINGS

Additional features and advantages of the invention will be described below with reference to the drawings, in which.

Figure 1:
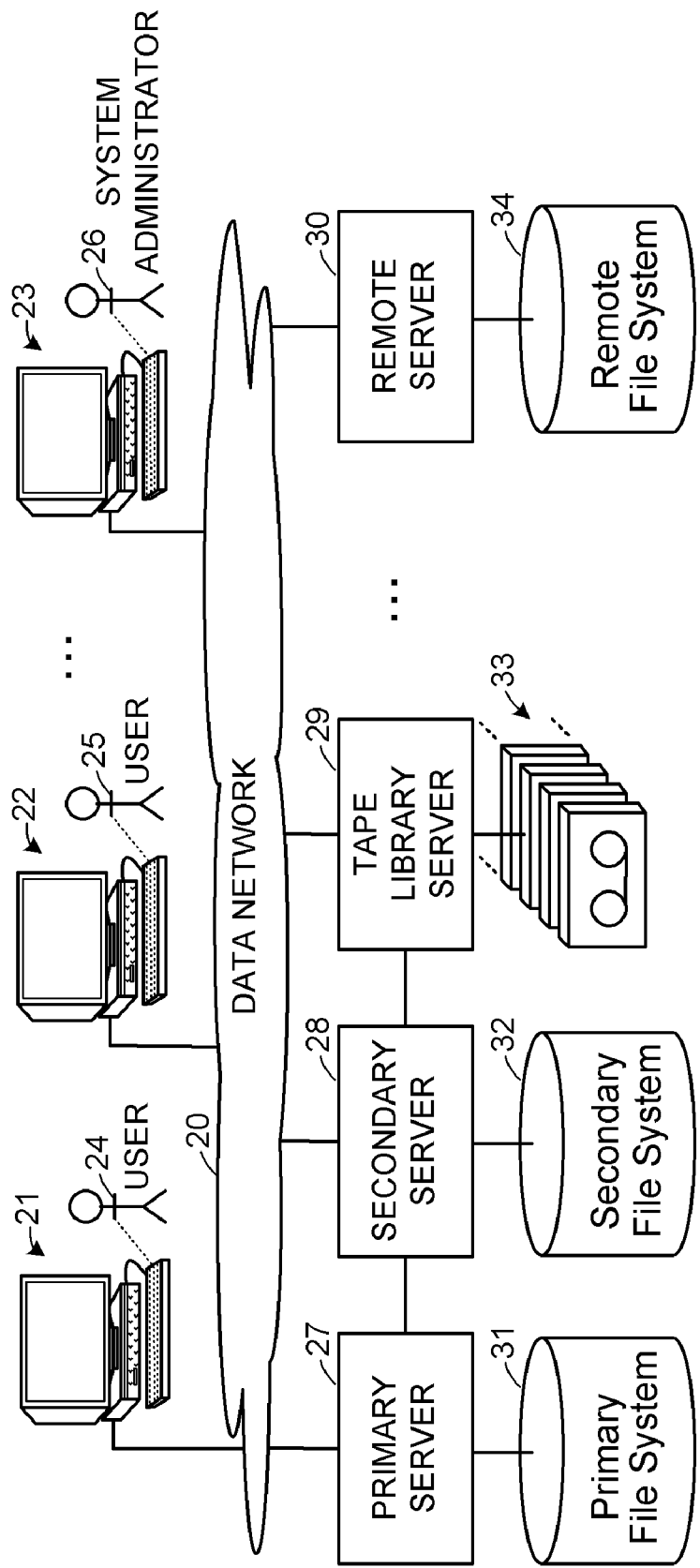
FIG. 1 is block diagram of a data processing network including hierarchical data storage and remote data storage.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system incorporating the present invention. The data processing system includes a data network 20 interconnecting clients 21, 22, 23 and servers such as a primary network file server 27, a secondary network file server 28, a tape library server 29, and a remote network file server 30. The data network 20 may include any one or more of network connection technologies, such as Ethernet, and communication protocols, such as TCP/IP. The clients 21, 22, for example, are workstations such as personal computers using either UNIX or Microsoft WINDOWS® operating systems. The workstations are operated by human users 24, 25, 26. The user 26 is a system administrator having sufficient privileges for configuring the servers 27, 28, 29, 30 and for receiving status and error messages from the servers.

The present invention facilitates information lifecycle management (ILM) in the data processing system of FIG. 1, such as when files are migrated between the servers. The primary server 27, secondary server 28, and tape library 29 together comprise a hierarchical storage system, in which files are migrated automatically from a primary file system 31 to a secondary file system 32 and from the secondary file system 32 to tape storage 33 when the users do not frequently access the files. Further details regarding a hierarchical storage system are found in Amegadzie et al., "Selection of Migration Methods Including Partial Read Restore in Distributed Storage Management," US Pat. Application Pub. 2006/0212746 published Sep. 21, 2006, incorporated herein by reference. For disaster recovery, the primary server 27 also migrates files from the primary file system 31 to a remote file system 34 maintained by the remote server 30. Further details regarding migration for disaster recovery are found in Hayden et al., "Internet Protocol Based Disaster Recovery of a Server," US Pat. Application Pub. 2005/0193245 published Sep. 1, 2005, incorporated herein by reference.

Figure 2:
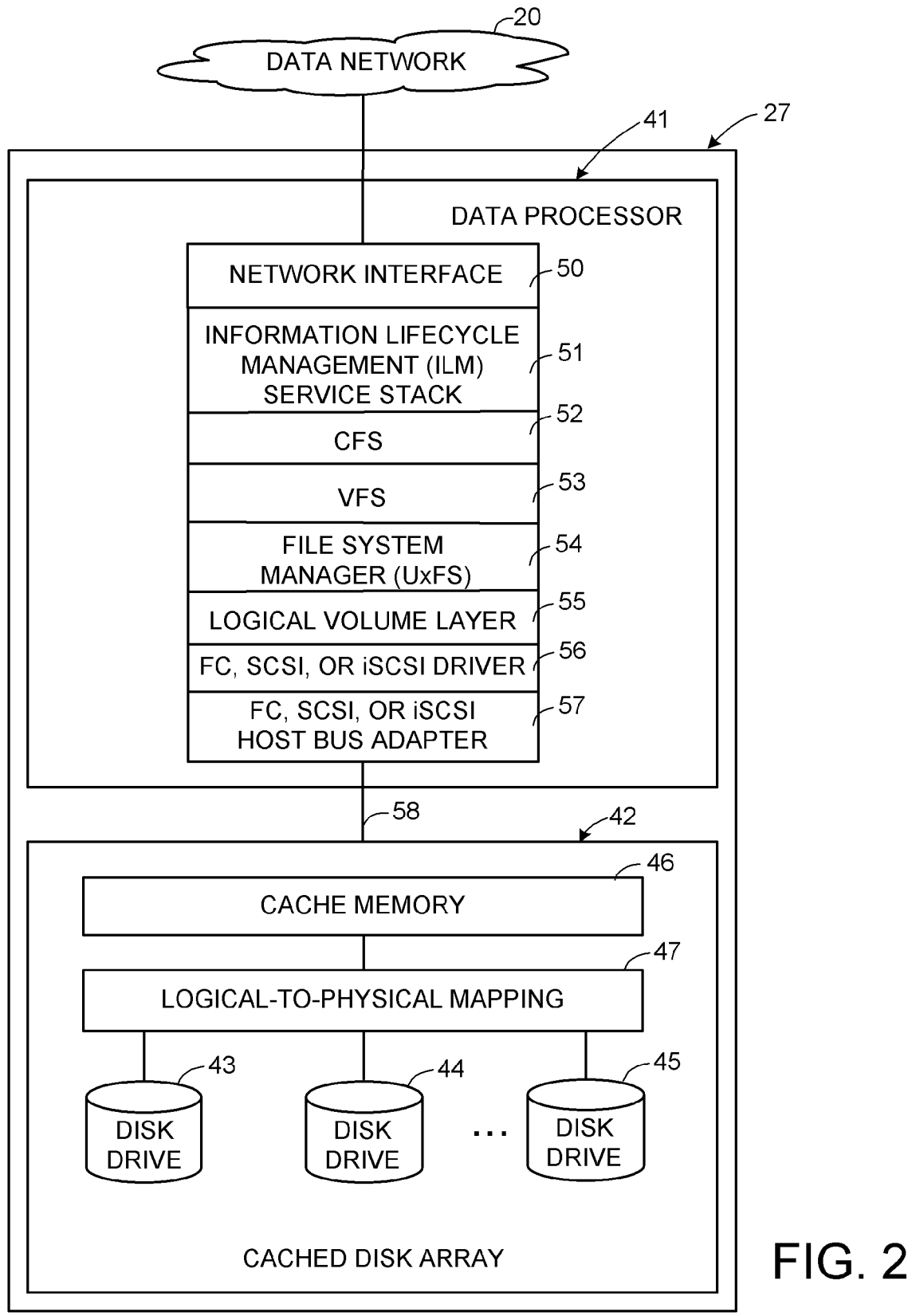
FIG. 2 is a block diagram of a file server including an information lifecycle management (ILM) stack.

As shown in FIG. 2, the primary file server 27 includes at least one data processor 41 and a cached disk array 42. The network file server 27 is managed as a dedicated network appliance, integrated with popular network file systems in a way, which, other than its superior performance, is transparent to the end user. The data processor 41, for example, is a high-end commodity computer. The cached disk array 42 includes multiple disk drives 43, 44, 45, a high-speed random-access cache memory 46, and logical-to-physical mapping 47 between the cache memory 46 and the disk drives.

The data processor 41 has a network interface 50 for communication of data packets over the data network 20 via a data transmission protocol such as TCP/IP. The data processor 41 is programmed with an information lifecycle management (ILM) service stack 51, which is further described below with reference to FIG. 3. The ILM stack is layered over a Common File System (CFS) module 52, and the CFS module is layered over a Virtual File System (VFS) module 53. The VFS module 53 is layered over a Universal File System (UxFS) module 54. The UxFS module 54 is a file system manager for managing a UNIX-based file system 55 in storage of the cached disk array 42. Management of a UNIX-based file system is described in Uresh Vahalia, *Unix Internals: The New Frontiers*, Chapter 9, "File System Implementations," Prentice-Hall, Inc., New Jersey, 1996, p. 261-289.

The UxFS module 54 accesses data organized into logical volumes defined by a logical volume layer module 55. Each logical volume maps to contiguous logical storage addresses in the cached disk array 42. The logical volume layer module 55 is layered over a Fibre-Channel (FC), Small Computer System Interface (SCSI), or an Internet SCSI (iSCSI) driver 56. The data processor 41 sends storage access requests through a host bus adapter 57 using the FC, SCSI, or iSCSI protocol, depending on the physical data link 58 between the data processor 41 and the cached disk array 42.

Further details regarding the construction of a network file server are found in Vahalia et al., U.S. Pat. No. 5,893,140 issued Apr. 6, 1999, incorporated herein by reference, and Xu et al., U.S. Pat. No. 6,324,581, issued Nov. 27, 2001, incorporated herein by reference.

Figure 3:
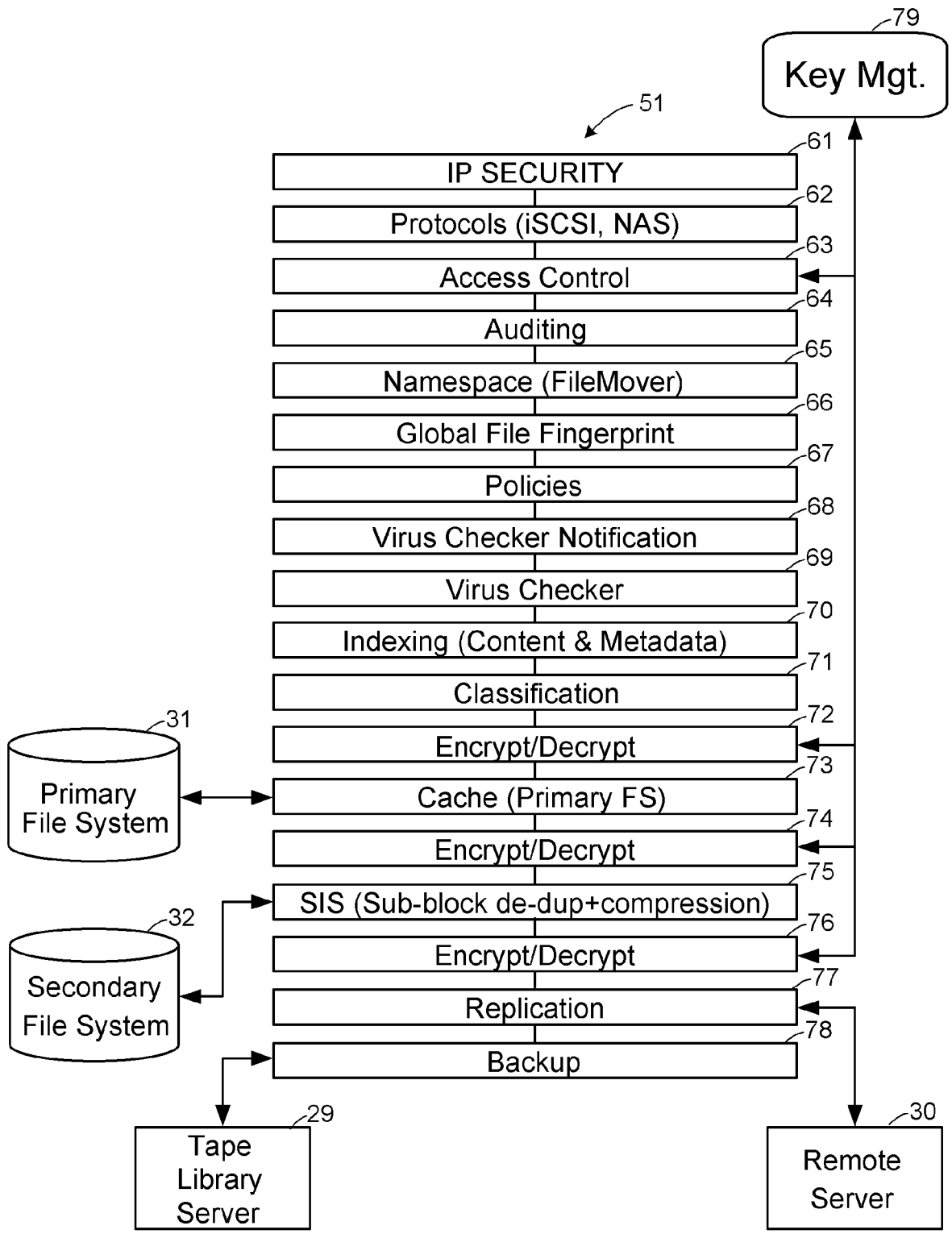
FIG. 3 shows details of the ILM stack introduced in FIG. 2.

FIG. 3 shows the construction of the ILM services stack 51. The ILM services stack includes an Internet Protocol (IP) security module 61 for secure data transmission over the data network (20 in FIG. 1) using protocols such as the Internet Small Computer Systems Interface (iSCSI) or other Network Attached Storage protocols handled by a Protocols module 62. The ILM services stack includes a client access control module 62 using encryption keys for various clients stored in a key management database 79. An auditing module 64 keeps a record of client access to the file server. A namespace module 65 provides flexibility in renaming storage volumes or file systems when the storage volumes or file systems are moved to the network file server.

The ILM services stack 51 has a module 66 for computing a global file fingerprint of each file, so that a miss-match between the fingerprints of two files is an indication that the two files have different content, and a match between the fingerprints of two files is an indication, to a high degree of certainty, that the content of the two files is identical. For example, the global file fingerprint module computes a SHA-256 signature in accordance with "Secure Hash Standard," Federal Information Processing Standards Publication 180-2, Aug. 1, 2002, National Institute of Standards and Technology (NIST), Gaithersburg, Md.

The ILM services stack 51 has a policies module 67 associating ILM policies for data retention, replication, and backup with certain storage volumes, file systems, or files. A virus checker notification module 68 implements notification methods, such as notifying the user and the system administrator, when a virus checker module 69 detects a virus in a file. Further details regarding virus checking are found in Van Brabant, "On-Access and On-Demand Distributed Virus Scanning," US Pat. Application Pub. 2005/0149749 published Jul. 7, 2005, incorporated herein by reference. An indexing module 70 provides indexing for fast retrieval of a file upon searching for a file having specified content or metadata. For example, the indexing module 70 may compile an index such as an alphabetized list of uncommon words with pointers to where the uncommon words appear in an electronic document.

A classification module 71 classifies files by format or content. An encryption/decryption module 72 provides for secure storage of files maintained in the primary file system 31 by a cache module 73. A second encryption/decryption module 74 provides for a higher level of security for a secondary file system 32, and a single instance storage (SIS) module 75 provides sub-block de-duplication and compression for conserving storage of the secondary file system 32. A third encryption/decryption module 76 provides an even higher level of security for files that are replicated over the data network to remote storage or backed-up onto tape storage. A replication module 77 provides replication of files to the remote server 30, and a backup module 78 provides backup of files to the tape library server 29.

The present invention is more specifically directed to facilitating ILM by using multiple data processors for the classification and indexing of objects in a very large namespace. For example, the namespace is a hierarchical file system such as a UNIX-based file system, the objects are files (including directories and links) in the file system, and the classification and indexing gathers file-specific information useful for migrating the files from primary storage to secondary storage or remote storage, and for recalling the migrated files from the secondary storage or remote storage. By gathering the file-specific information before the migration process is begun, the migration process can be performed faster in order to reduce the time that the migration process may interfere with or slow down client access to the primary file server.

Figure 4:
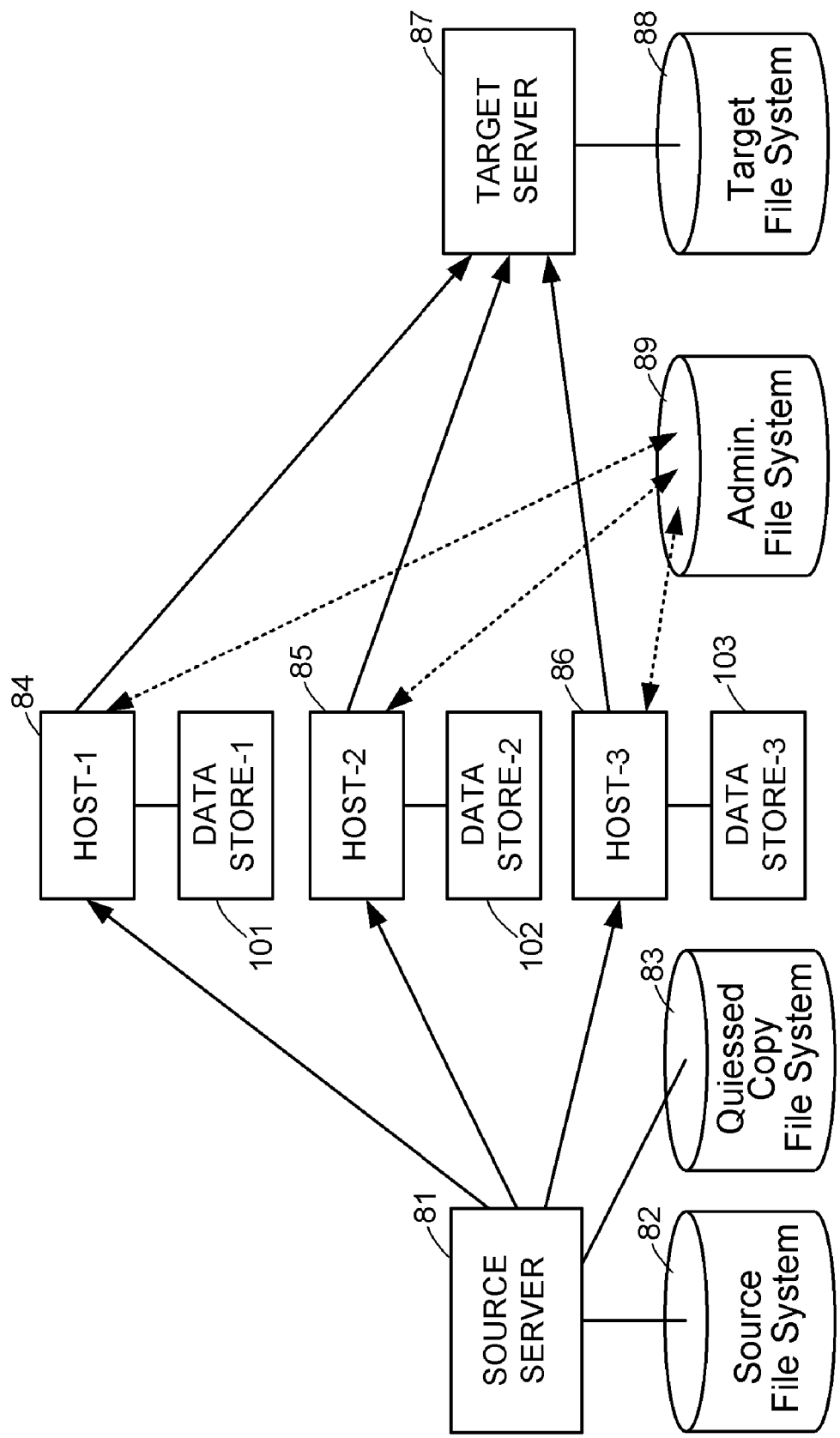
FIG. 4 is a block diagram showing data flow when multiple host processors are used for migrating files from a source file server to a target file server.

FIG. 4 shows data flow when multiple host processors 84, 85, 86 migrate files from a source server 81 to a target server 87. The source server 81, for example, is the primary server 27 in FIG. 1, and the target server 87 is the secondary server 28 for the case of migration from the primary file system 31 to the secondary file system 32 in FIG. 1, or the target server 87 is the remote server 30 for the case of migration from the primary file system 31 to the remote file system 34 in FIG. 1. The host processors 84, 85, 86 could be any of the client workstations 21, 22, 23 (for example, performing migration tasks background), or additional servers in the data network 20.

At the beginning of the migration process, read-write access to the source file system is temporarily suspended to create a quiessed copy file system 83 when any pending read-write transactions upon the source file system are completed. By using a snapshot copy facility to create the quiessed copy file system, it is possible to immediately resume read-write access to the source file system as soon as the pending read-write transactions upon the source file system are completed. Once the quiessed copy file system 83 is made, the host processors 84, 85, and 86 may operate in parallel to read files from the quiessed copy file system and write files to the target file system 88. However, this should be done in such a way as to minimize any access conflicts while writing to the target file system 88 and to balance loading upon the hosts processors.

Figure 5:
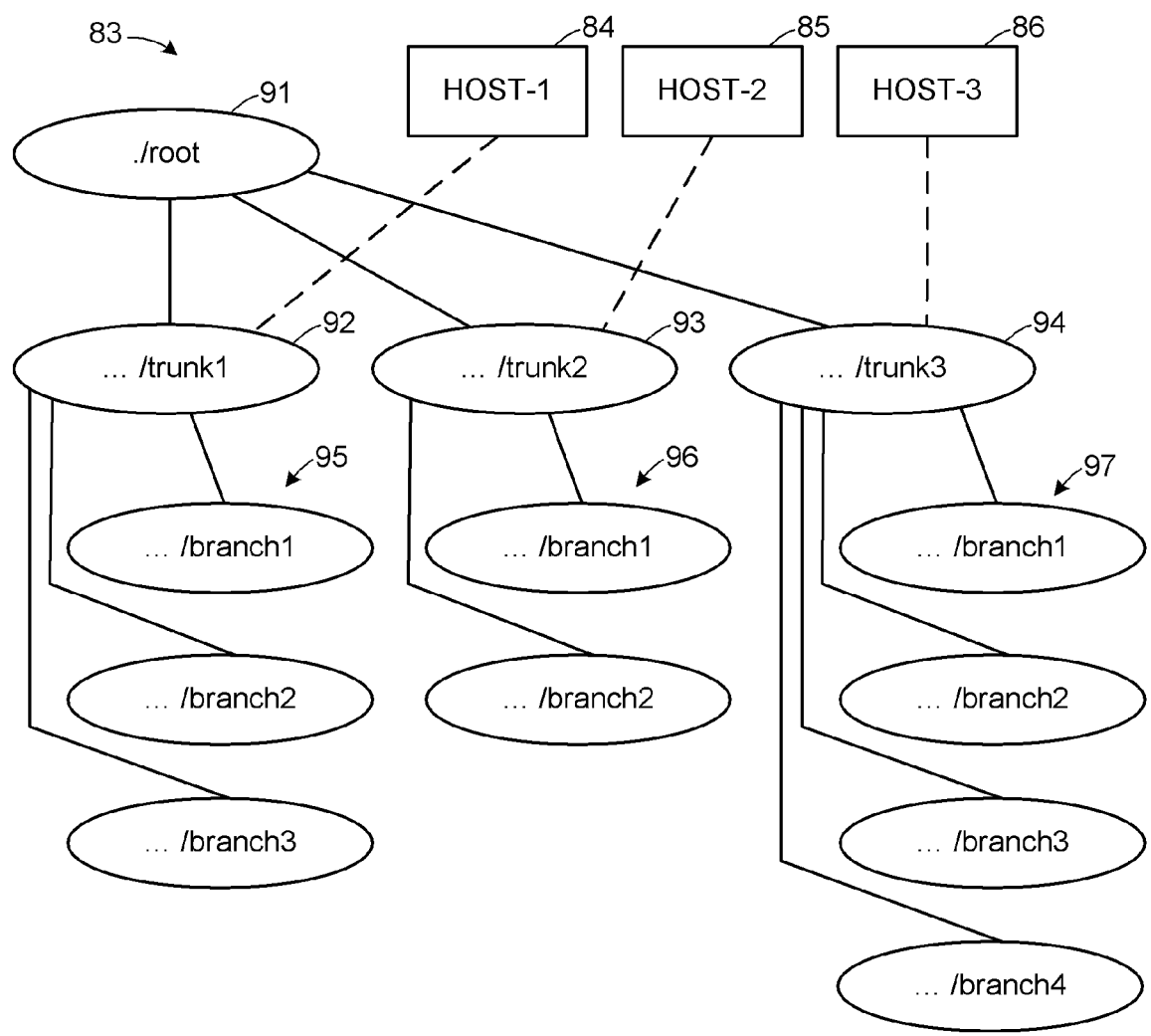
FIG. 5 is a schematic diagram of a file system and the assignment of subdirectory trees of the file system to respective host processors in FIG. 4.

As shown in FIG. 5, in order to minimize any access conflicts to the target file system 88, the quiessed copy file system 83 is subdivided into disjoint sets of subdirectory trees, and each host processor migrates the subdirectories in a respective one of the disjoint sets of subdirectory trees. In this fashion, there will not be any conflict between one host processor requesting a read or write lock upon any subdirectory in the target file system with any write lock held by another host processor upon any portion of the target file system. For example, the quiessed copy file system 83 has a root directory 91, and trunks 92, 93, and 94 which are sub-directories of the root directory. The first host processor 84 migrates the sub-directories in a first subdirectory tree including the trunk 92 and its subdirectories or branches 95, the second host processor 85 migrates the subdirectories in a second subdirectory tree including the trunk 93 and its branches 96, and the third host processor 96 migrates the subdirectories in a third subdirectory tree including the trunk 94 and its branches 97.

In order to balance loading upon the host processors, the quiessed copy file system 83 can be subdivided into many more disjoint subdirectory trees than there are host processors, and once a host processor is finished migrating the directories in an assigned one of the subdirectory trees, then one of the remaining unassigned subdirectory trees can be assigned to the host processor so that the host processor will then migrate the subdirectories in one of the remaining subdirectory trees. This will occur in the usual case of a file system that has more trunks than host processors, and otherwise, each host processor could initially be assigned an even lower level subdirectory tree such as a branch and the subdirectories of the branch.

For many applications, the data files (i.e., the files that are not directories or links) are much larger than the directories and have a wide range of sizes. In addition, often it is desired to perform ILM tasks such as SIS, sub-block de-duplication, indexing, classification, encryption, and compression upon the data files when the data files are migrated. Therefore most of the host processing time is consumed by migrating the data files rather than migrating the directories. For more efficient load balancing of the host processing time, it is desirable to balance the load based on the sizes of the data files. Since the data files are leaves of the sub-directory trees, it is convenient to first migrate the directories, and then migrate the data files. During the migration of the directories, the directories are inspected to enumerate the data files and compile a record of the respective sizes of the data files, so that once the directories are migrated, the data files can be subdivided into similar sized groups, and each processor can be assigned a respective one of the groups of data files to be migrated. For a UNIX-based file, the inode number serves as a primary key for indexing the file, so that it is convenient to group the data files in terms of inode number ranges, and to assign each host processor a respective inode number range of data files to be migrated.

Figure 6:
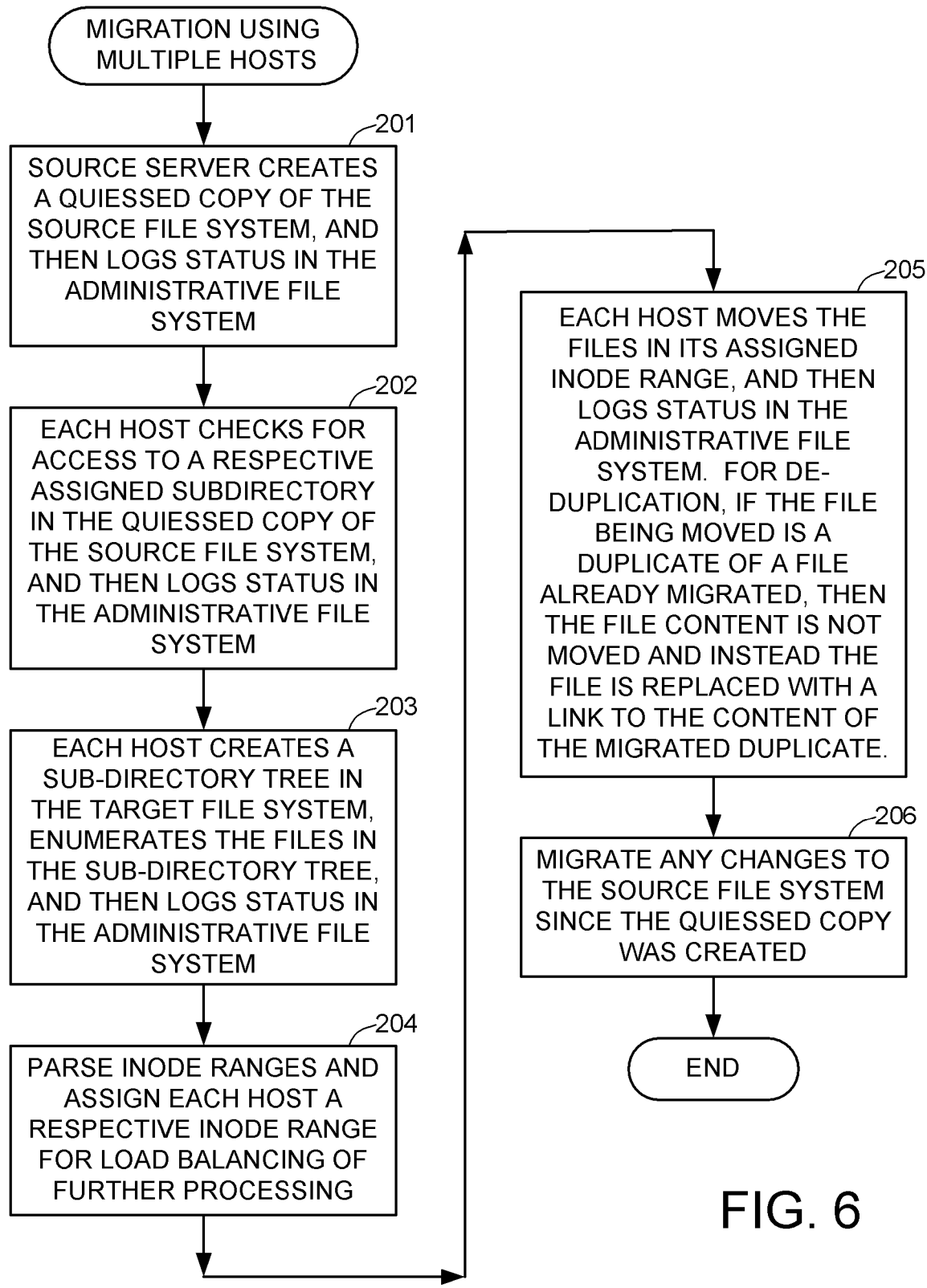
FIG. 6 is a flowchart of a method of file system migration using multiple host processors.

FIG. 6 shows a specific example of migration using multiple host processors. The migration process, for example, is initiated by a command from the system administrator (26 in FIG. 1), and coordinated by a supervisory program in the system administrator's workstation (23 in FIG. 1). An administrative file system (69 in FIG. 4) keeps a record of the status of the migration process and servers as a common store of information shared among the hosts and the supervisory program.

In a first step 201, the source server creates the quiessed copy of the source file system, and then logs status in the administrative file system (89 in FIG. 4). In response, the supervisory program assigns subdirectory trees of the quiessed copy of the source file system to respective host processors, and dispatches a subdirectory tree migration preparation job to each host processor. In step 202, each host processor checks for access to its assigned subdirectory (i.e., the root of its assigned subdirectory tree) in the quiessed copy of the source file system, and then logs, in the administrative file system, a status indication of whether or not its assigned subdirectory is accessible.

Once all of the host processors have access to their respective assigned subdirectory trees, the supervisory program dispatches a subdirectory tree migration start job to each host processor. In step 203, each host processor creates a subdirectory tree in the target file system corresponding to its assigned subdirectory tree in the quiessed copy of the primary file system, enumerates the files in the subdirectory tree in the quiessed copy of the source file system, and then logs status in the administrative file system.

For example, the hosts create, in the administrative file system, an index of the inodes of the enumerated files and the size of each file. The index may also include the full pathname of the file. The full pathname is useful for writing the file into the target file system for a migration where the target file system is not simply a copy of the source file system. In this case, new target file system directories are initially created empty of the data files, and then the full pathname is used to quickly update the directories in the path for the data file when the data file is written to the target file system. For example, in a hierarchical storage system, the target file system may be quite different from the source file system after migration because certain files of the source file system may not be migrated. Typically a file will not be migrated from the source file system to the target file system if the file has a preemption attribute set, or if the file is smaller than a specified size.

In step 204, the supervisory program accesses the index of inodes and file sizes to parse inode ranges, and to assign to each host a respective one of the inode ranges for load balancing of further processing. For example, each inode range represents a "work unit" requiring a similar amount of host processing. In step 205, each host moves the files in its assigned inode range from the quiessed copy of the source file system to the target file system, and then logs status in the administrative file system. The movement typically involves creating the file in the target file system, reading data from the file in the quiessed copy of the source file system, and writing the data to the file in the target file system. The movement may involve de-duplication by checking whether the file content is a duplicate of the content of a file that has already been migrated, and if so, then replacing the file to be migrated with a link to the duplicate file content that has already been migrated. The movement may also involve classifying the file and indexing content of the file, and compressing and encrypting the content of the file. Once a host has moved the files in its assigned inode range, the host logs status in the administrative file system In step 206, once the supervisory program has found that all of the hosts have logged status indicating successful completion of file transfer, the supervisory program migrates any changes made to the to the source file system since the quiessed copy was created. For example, another quiessed copy of the source file system can be created, and then changed directories or files can be identified by comparing modification time attributes of the directories and files to the time when the initial quiessed copy was made. A list of the changed directories and the changes made can also be maintained by a snapshot copy facility as the changes are made. In any case, step 206 can be repeated until the target file system is brought up-to-date with a source file system during concurrent read-write client access to the source file system.

In practice, the migration of a source file system to a new target file system may cause significant disruption to ongoing data processing operations from the start of the migration until the target file system is brought up-to-date with the source file system, because the migration process and the network clients must share access to the primary file system through the primary server. When ILM is added to the migration process, the duration of the disruption can be extended considerably. Therefore, there is a desire to accelerate the ILM processing that is done during migration.

It has been discovered that is possible to accelerate the migration process and the ILM processing that is done during migration by collecting certain file-specific information from the source file system prior to the start of migration. The file-specific information for accelerating the migration process includes, for each file, a full pathname and a classification state indicating whether or not the file has been untouched, copied, linked, secondary-ized, source deleted, or modified. For accelerating de-duplication, the file-specific information includes a signature for each file. The file-specific information may also include a classification of the format or content of the file, and a concordance or index of the content of the file.

Figure 7:
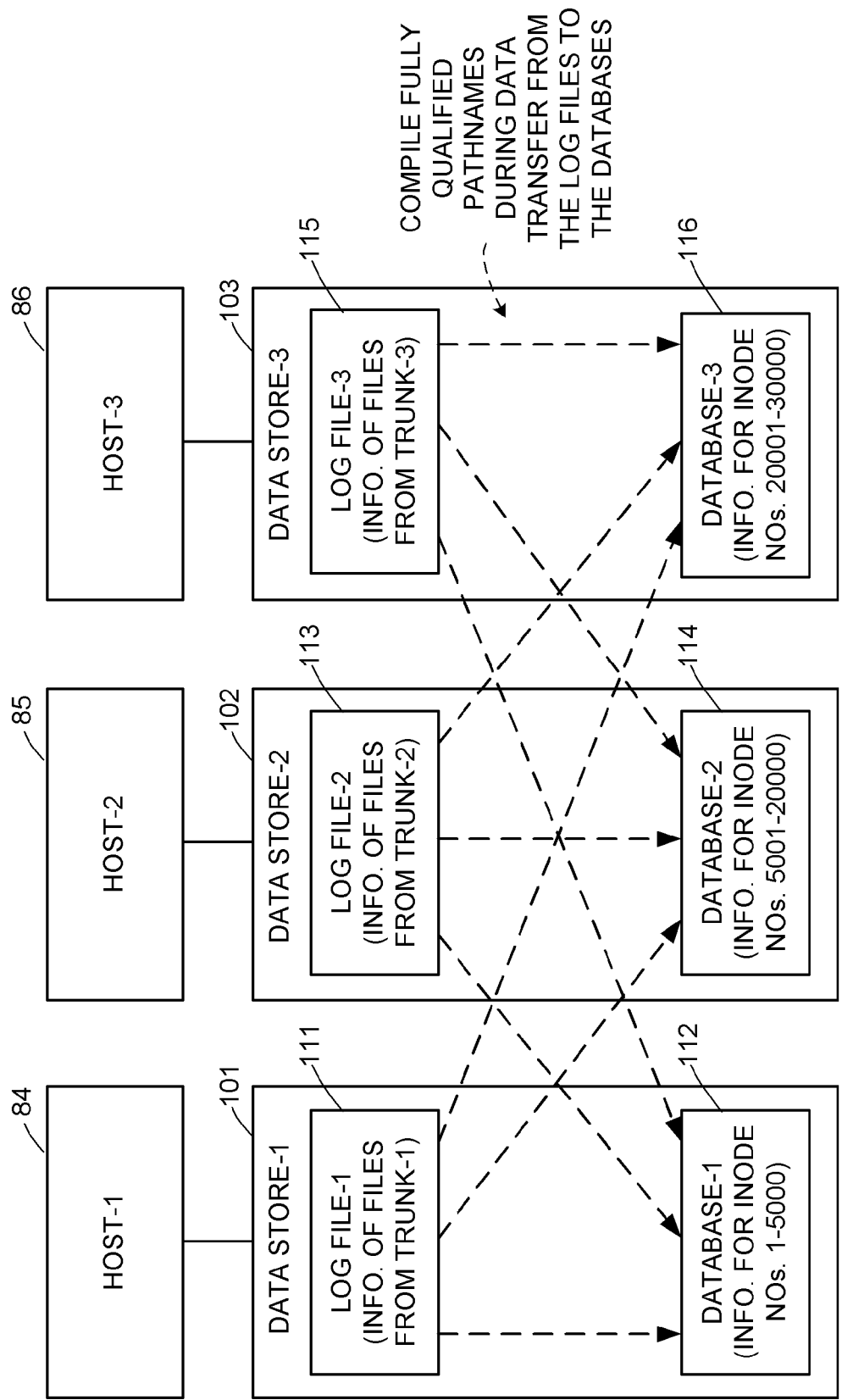
FIG. 7 is a block diagram showing transfer of file-specific information from log files for subdirectory trees of the file system in FIG. 5 to databases for inode ranges of the file system.

As shown in FIG. 7, each of the host processors 84, 85, 86 has a respective data store 101, 102, 103, and executes an instance of a utility program for collecting the file-specific information in a respective log file 111, 113, 115 when recursively traversing an assigned subdirectory tree of the source file system concurrent with client read-write access to the source file system prior to migration. After traversal, the collected information is transferred to a database 112, 114, 116 for the respective inode number range which is assigned to each host for migration. Fully qualified pathnames for the files are compiled during the data transfer from the log files to the databases.

Since the hosts discover the files and the size of each file when traversing the respective subdirectory trees of the source file system, the assignment of the respective inode number ranges to the hosts for migration based on load balancing considerations could be done prior to the beginning of the migration process. The data in the databases could be updated continuously after an initial loading as the instances of the utility program re-traverse the subdirectory trees and discover changed files and changes to their file-specific information. In addition, the particular assignment of the respective inode ranges to the hosts for migration could be periodically updated as files are added to or deleted from the source file system, and as the files of the source file system are extended or truncated.

For de-duplication, the databases 112, 114, 116, could be organized so that the inode number is a primary key for the records of file-specific information for each file, and the file signature is a secondary key. The use of the signature as a secondary key facilitates the search of the databases for a given signature during de-duplication. For example, when a record of information about a file is transferred to the database of a host, then that host may send search requests specifying the signature of the file to the other hosts in order to determine whether or not the databases of the other hosts contain files having the same signature. If so, then the content of these files can be compared to identify duplicates. Moreover, a host may search its own database to find records of files that are links, and upon finding a link, recalling the target of the link, and then accessing the record of the target of the link to obtain further information about the target of the link if the target of the link is in its own database, and if not, sending a recall request to the host that should have a record about the target of the link in its database. In this fashion, before migration, the hosts may discover groups of duplicate files, select one file of each group for content retention, and select the other files of each group for replacement with a link to the content of the file selected for content retention.

Figure 8:
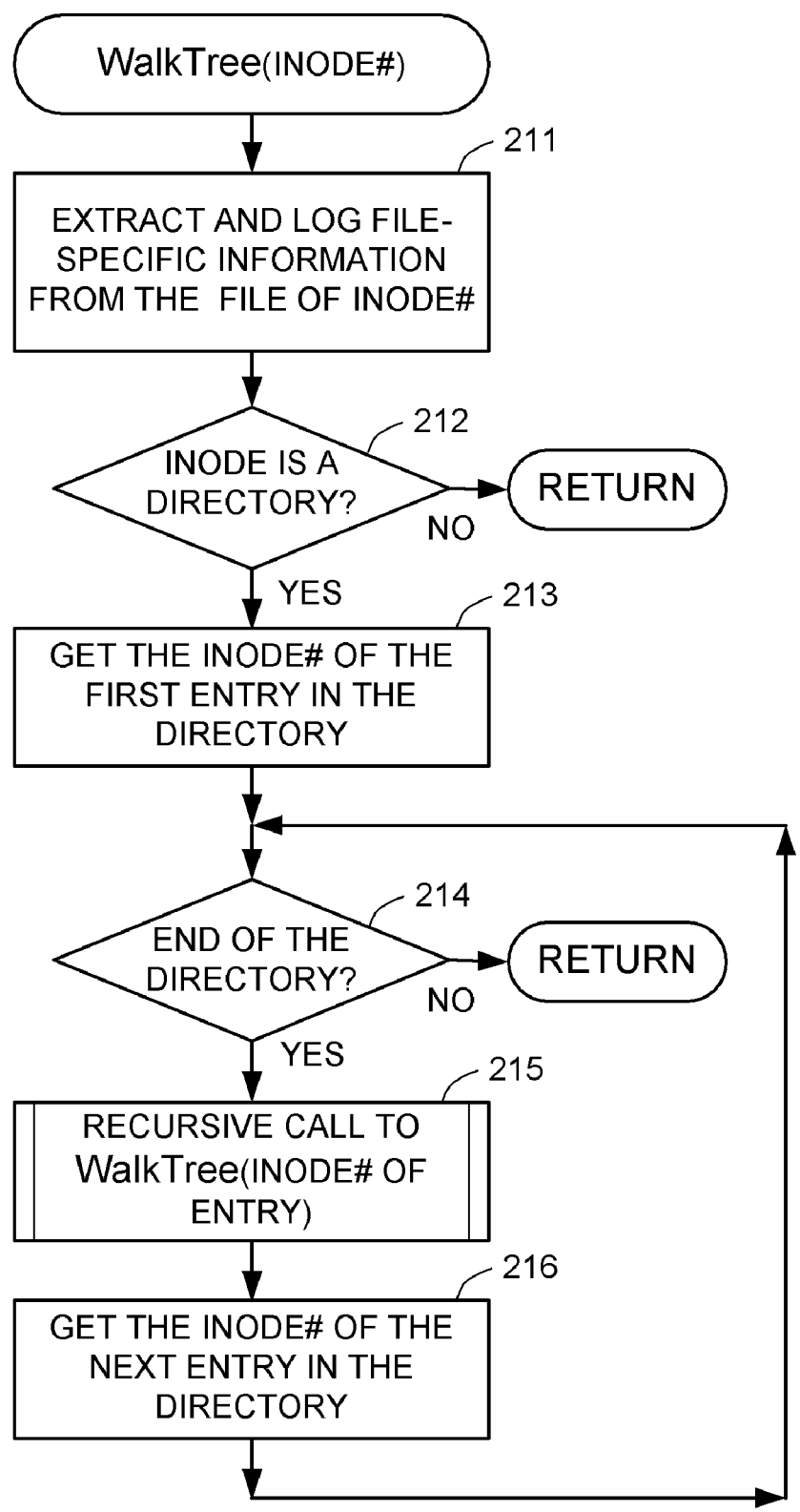
FIG. 8 is a flowchart of a recursive subroutine for traversing a specified subdirectory tree to gather information about files the subdirectory tree.

FIG. 8 shows a flowchart of a subroutine called "Walk-Tree" for gathering file-specific information while traversing the tree of a directory having a specified inode number. In a first step 211, file-specific information is extracted from the file of the specified inode number, and logged in a log file. For example, step 211 includes classification of the format and content of the file, computing an SHA-256 signature of the content of the file, and indexing content of the file. Next, in step 212, if the inode is not a directory, then execution returns. Otherwise, execution continues to step 213. In step 213, the first entry in the directory is accessed to fetch its inode number. In step 214, if the end of the directory is reached when fetching the entry, then execution returns. Otherwise, execution continues to step 215. In step 215, the WalkTree routine is called recursively to gather file-specific information of the inode of the directory entry accessed in step 213 and any subdirectories of this inode. In step 216, the next entry in the directory is accessed to fetch its inode number, and execution loops back to step 214. Scanning of the directory entries continues by repeating steps 214, 215, and 216 until the end of the directory is reached in step 214 and execution returns.

For example, the following file-specific information is collected in the log file:

Inode: a value representing a unique identifier for the file in a given file system Directory: the fully qualified path of parent directory Filename: the name of the file Hash: a unique SHA-256 signature for the file—used to identify duplicate files Stat: an octal value which represents the file type: dir, file, link, etc.

Size: a value representing the size of the file in bytes

Links: a value containing the number of file paths pointing to this one file (a hard link)

The database includes the file-specific information from the log file, and combines the directory path with the filename to crate a fully qualified pathname for the file. In addition, the database further includes:

Status: a value representing the classification state of the file.

For example, the utility program is named "walkTree," and its behavior is determined by supplying command line arguments as follows:
walkTree [OPTION]
Where OPTION is:
-p<path> Starting path. Default: ./
-d<depth> Maximum directory depth to scan (0 returns only directory names)
-e<list> Exclude list of comma separated files and directories: dir1, dir2, dir3
-h Generate a SHA-256 hash for each file
-v Generate verbose (human readable) output
Usage notes:
1. The default behavior is to list only the files in the current directory (depth of 1)
2. If depth is specified as 0, only directory names in the path will be listed.
3. The file hash that is generated is a SHA-256 hash. If -h is not supplied, an asterisk is used as a place holder.
4. The -v switch will change the output to a human readable output. The default output is formatted for input to a data base access program described below.
5. The -h switch will significantly impact the speed of the traversal since each file must be read to generate the hash.

Examples

1. Collect file info for the path /fs2/users/smith and generate SHA-256 hashes for each file. Output to file inodes.dat:
./walkTree -p /fs2/users/smith -h -d 1000> inodes.dat
2. Collect file info for the path /fs2/users/smith but skip .etc, .snapshot, and temp directories:
./walkTree -p /fs2/users/smith -e ".etc,.snapshot,temp" -d 1000> inodes.dat
3. Collect file info for the current directory and generate SHA-256 hashes. Output to the screen in a human readable format:
./walkTree -d 1 -h -v The databases are formatted to be accessed by a database program called "gridDB." This program is based on the Berkeley DB from sleepycat.com. The "gridDB" program accepts, as input, formatted data created by the WalkTree program. The data is stored in a database and is indexed by the file's inode. Duplicate inodes may be added to the database providing that they point to a unique filename as would be the case with hard linked files. Symbolic links are stored as the filename of the symbolic link, not the file that the link refers to.

The behavior of gridDB is determined by the command line arguments supplied:
gridDB [OPTION]
Where OPTION is:
-l Load database
-d Dump database
-u Update database
-v Verbose output
-f<filename> Specify a filename for load, dump or update
-r<filename> Specify a filename of ranges (overrides -i switch)
-i<range> Specify a single inode range (start:finish)
-s<status> Update the status of an inode
-h<hash> Update the hash for an inode
-p<dB home> Specify a path to the database file(s)
Status codes:
0=UNTOUCHED
1=COPIED
2=LINKED

3=SECONDERIZED
4=SRC_DELETED
5=MODIFIED

Usage notes:

1. To start a new database, just remove the inodes.db file from the database directory.

2. The -l, -d, and -u switches do not take any additional arguments. They just specify which mode to run in.

3. Attempting to load duplicate data will result in a warning message about a duplicate record along with a reference to the line in the input file that contains the duplicate data.

4. Input must conform to exactly the output that is generated by the walkTree tool. Incorrectly formatted data could result in bad data being stored in the database, or possibly a program crash.

5. Inode ranges can be supplied in one of 2 different methods.

6. On the command line with using the -i switch using the format s:e where s is the starting inode, and e is the end inode (inclusive). If only a single inode is needed, just enter the inode.

7. Using a range file. A range file is specified with the -r switch will contain a single line formatted as follows: s:e,s:e,s:e, . . . . Each inode proceed when loading or dumping the database will be compared against each range entry. Testing will continue until a match is found, or all ranges have been tested. If a match is not found, the inode will be skipped.

8. When updating the status of a record, a single inode must be supplied using the -i switch along with the status using the -s switch.

9. The argument passed with the -p switch is a path to the database file. The file name will be inodes.db 10. When updating the status of a duplicate inode (hardlinked files), only the first duplicate will be updated unless a path is specified with the -f switch. The path will uniquely identify the record.

Examples

1. Load the database from a file with the name inodes-fs2.dat and put the database in directory /home/grid:

./gridDB -l -f inodes-fs2.dat -p /home/grid

2. Load the database from a file with the name inodes-fs2.dat and only process the ranges in file /tmp/ranges.dat:

./gridDB -l -f inodes-fs2.dat -f /tmp/ranges.dat

3. Dump a range of inodes to a file in human readable format:

./gridDB -d -i 1000:30000 -v -f inodes-dump.dat

4. Update the status of inode 34567892 to COPIED:

./gridDB -u -i 34567892 -s 1

5. To validate the database, compare the original input file to a newly generated dump using the following technique:

cat inodes.txt | sort | grep -v "Changed Dir"> file1
   # ./gridDB -d -f file2
   # cat file2|sort> file3
   # diff file1 file3

Figure 9:
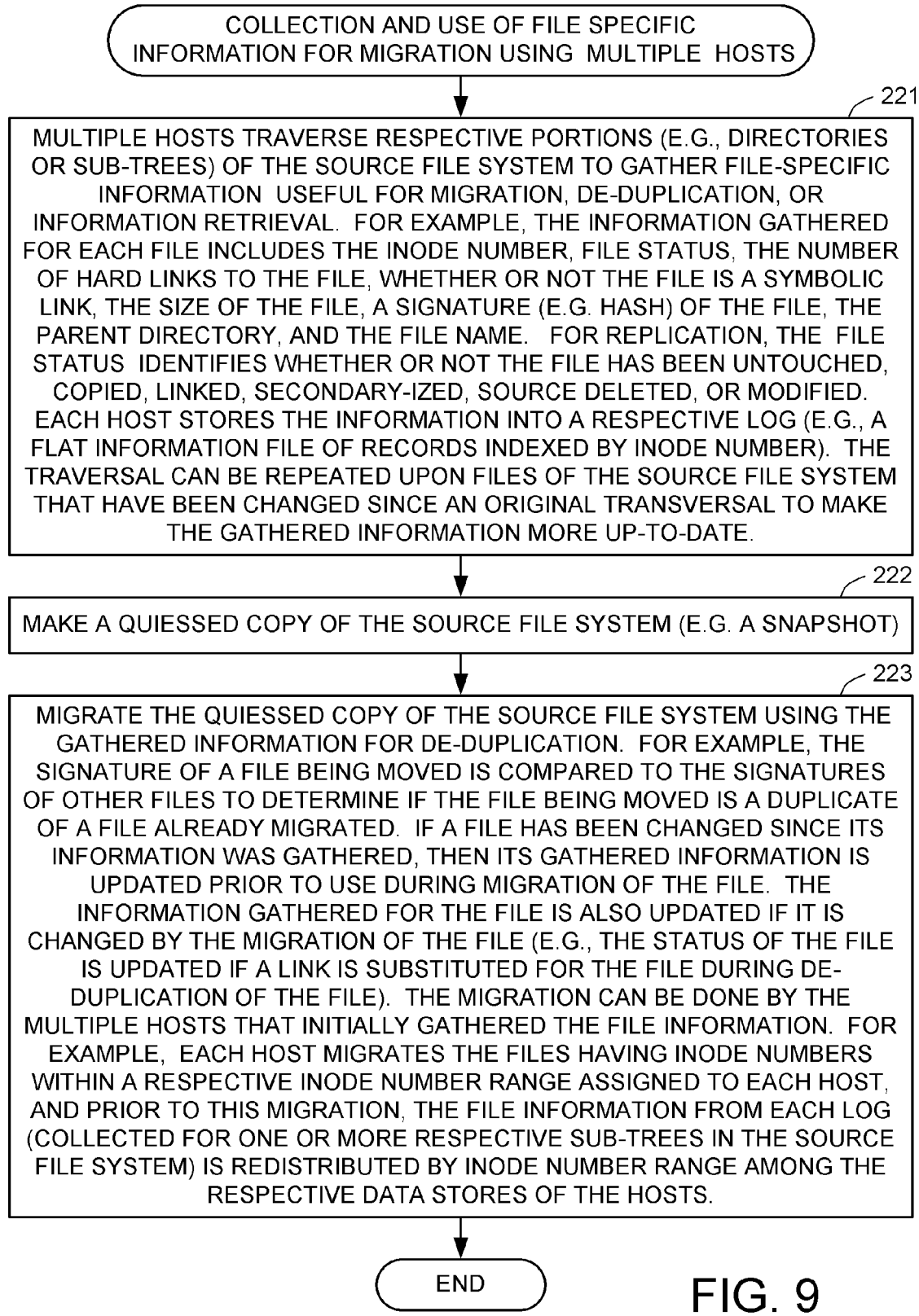
FIG. 9 is a flowchart showing the collection and use of file-specific information for accelerating the process of file system migration introduced in FIG. 6.

FIG. 9 is a flowchart showing the collection and use of file-specific information for accelerating the process of file system migration introduced in FIG. 6. In step 221, multiple hosts traverse respective portions of the source file system to gather file-specific information useful for migration, de-duplication, and information retrieval. For example, a supervisory program accesses a root directory of the source file system, and dispatches one of the subdirectories in the root directory to each of the hosts, and each host calls the "WalkTree" subroutine of FIG. 8 specifying its assigned subdirectory as the value of the inode number parameter. The information gathered for each file of the source file system includes the inode number, file status, the number of hard links to the file, whether or not the file is a symbolic link, the size of the file, a signature (e.g. hash) of the file, the parent directory, and the file name. For migration or replication, the file status identifies whether or not the file has been untouched, copied, linked, secondary-ised, source deleted, or modified. Each host stores the information into a respective log (e.g., a flat information file of records indexed by inode number). The traversal can be repeated upon files of the source system that have been changed since an original traversal to make the gathered information more up-to-date.

In step 222, the migration process begins by making a quiessed copy of the source file system (e.g., a snapshot copy of the source file system). In step 223, the quiessed copy of the source file system is migrated using the gathered information for de-duplication. For example, the signature of a file being moved is compared to the signatures of other files to determine if the file being moved is a duplicate of a file already migrated. If a file has been changed since its information has been gathered (as indicated by a comparison of the file's modification time to the time that its information was gathered), then its gathered information is updated prior to use during migration of the file. The information gathered for the file is also updated if it is changed by the migration of the file (e.g., the status of the file is updated if a link is substituted for the file during de-duplication of the file).

The migration in step 223 can be done by the multiple hosts that initially gathered the file-specific information in step 221. For example, each host migrates the files having inode numbers within a respective inode number range assigned to each host, and prior to this migration, the file information from each log (collected from one or more respective subdirectory trees in the source file system) is redistributed by inode number range among the respective data stores of the hosts.

In view of the above, there has been described a method of classification and indexing of files in a very large namespace in such a way that does not interfere with client read-write access to the files. This facilitates ILM during file migration so that ILM can be put in place for the first time without significant disruption to ongoing data processing operations. A utility program traverses the file system to create a log of file-specific information about the file system. For identification of duplicates, the utility program produces a unique signature for each file. Respective instances of the utility program are started on multiple nodes upon which the file system is mounted. A fully qualified pathname is compiled during transfer of information from the log to a database. Multiple databases can be produced for the file system such that each database contains the file-specific information for a specified range of inode numbers. The database also maintains classification state for each file. For example, for a migration or replication process, the classification state identifies whether or not the file has been untouched, copied, linked, secondary-ized, source deleted, or modified.

What is claimed is:

1. A method of storage or retrieval of computer data, the computer data being contained in files of a file system in electronic data storage, the file system further including a hierarchy of directories of the files, said method comprising:

a) concurrently executing respective instances of a utility program on multiple host processors to traverse respective subdirectory trees of the hierarchy of directories of the files in order to collect, in at least one log, file-specific information of files in the file system; and then b) when storing or recalling computer data of a file in the file system, accessing the file-specific information of the file from said at least one log to facilitate the storing or recalling of the computer data of the file in the file system;

wherein the file system is subdivided into disjoint subdirectory trees, and each instance of the utility program is executed by a respective one of the host processors to record, in a respective log of the respective one of the host processors, file-specific information of files in a respective one of the disjoint subdirectory trees; and wherein the inode numbers of the files in the file system are subdivided into disjoint inode number ranges, each disjoint inode number range is assigned to a respective one of the host processors, and the file-specific information for the files having inode numbers within said each disjoint inode number range is transferred to a respective database of said respective one of the host processors so that said respective one of the host processors accesses the file-specific information in its respective database to facilitate storing or recalling of computer data of the files having inode numbers within said each disjoint inode number range.

2. The method as claimed in claim 1, which includes transferring the file-specific information from said at least one log to a database, and compiling fully-qualified pathnames of the files in the file system when transferring the file-specific information from said at least one log to the database, and storing the fully-qualified pathnames of the files in the file system in the database together with the file-specific information from said at least one log.

3. The method as claimed in claim 1, which further includes transferring the file-specific information from said at least one log to a database, and accessing the database when storing or recalling computer data of a file having file-specific information in the database.

4. The method as claimed in claim 3, which includes storing, in the database, signatures of the files having file-specific information in the database, and wherein the inode numbers are primary keys to records of the file-specific information in the database, and the signatures are secondary keys to records of the file-specific information in the database.

5. The method as claimed in claim 3, which further includes maintaining, in the database, classification state for the files having file-specific information in the database.

6. The method as claimed in claim 1, which is preformed to put information lifecycle management (ILM) in place in a data processing system without disruption to ongoing data processing operations in the data processing system.

7. The method as claimed in claim 1, wherein file-specific information from said at least one log is accessed during migration of the files in the file system in order to facilitate migration of the files in the file system.

8. The method as claimed in claim 7, wherein the file-specific information from said at least one log includes signatures of the files in the file system, and wherein the signatures of the files in the file system are accessed during the migration of the files in the file system in order to prevent migration of more than one copy of duplicate data content of files from the file system.

9. The method as claimed in claim 7, which further includes maintaining in the database status of the files having file-specific information in the database, wherein the status indicates whether or not each file having file-specific information in the database has been untouched, copied, linked, secondary-ized, source deleted, or modified.

10. A method of storage or retrieval of computer data, the computer data being contained in files of a file system in electronic data storage, the file system further including a hierarchy of directories of the files, said method comprising:

a) executing a utility program with a first data processor to traverse at least a subdirectory tree of the hierarchy of directories of the files in order to collect, in a log, file-specific information about files in the subdirectory tree; and then b) transferring the file-specific information for a specified range of inode numbers from the log to a database; and then c) accessing the database with a second data processor when storing or recalling computer data of a file having an inode number in the specified range of inode numbers;

which includes storing, in the database, signatures of the files of the file system having inode numbers within the specified range of inode numbers, and wherein the inode numbers are primary keys to records of the file-specific information in the database, and the signatures are secondary keys to the records of the file-specific information in the database; and which includes the second data processor searching the database for a given signature in order to find at least two files having duplicate data content, in order to eliminate more than one copy of the duplicate data content from the electronic data storage.

11. The method as claimed in claim 10, wherein the utility program is executed with the first data processor prior to the beginning of migration of files of the file system, and wherein the database is accessed with the second data processor during the migration of files of the file system.

12. A data processing system comprising:

electronic data storage containing a file system, the file system including files and a hierarchy of directories of the files; and multiple data processors coupled to the electronic data storage for access to the file system;

wherein each of the data processors is programmed for executing a respective instance of a utility program to traverse an assigned subdirectory tree of the hierarchy of directories of the files in order to collect, in a respective log, file-specific information about files in the subdirectory tree;

wherein each of the data processors is programmed for transferring, from the logs to a respective database, the file-specific information for a specified range of inode numbers assigned to said each of the data processors; and wherein said each of the data processors is programmed for accessing, from the respective database, the file-specific information for the specified range of inode numbers in order to facilitate storage or retrieval of computer data of files of the file system having inode numbers within the specified range of inode numbers assigned to said each of the data processors;

wherein the multiple data processors are programmed for storing, in the respective databases, signatures of the files of the file system having inode numbers within the specified ranges of inode numbers, wherein the multiple processors are programmed for searching the databases for a given signature in order to find at least two files having duplicate data content, in order to eliminate more than one copy of the duplicate data content from the electronic data storage.

13. The data processing system as claimed in claim 12, wherein the multiple data processors are programmed for migrating files of the file system during a migration process wherein respective instances of the utility program are executed concurrently by the multiple data processors to collect the file-specific information prior to the beginning of migration of files of the file system, and wherein the databases are accessed by the multiple data processors during the migration of files of the file system in order to facilitate the migration of files of the file system.

14. The data processing system as claimed in claim 13, wherein the multiple data processors are programmed for storing, in the respective databases, signatures of the files of the file system having inode numbers within the specified ranges of inode numbers, and wherein the data processors access the signatures in the databases in order to identify files of the file system having duplicate data content so as to avoid migration of multiple copies of the duplicate data content.

15. The data processing system as claimed in claim 12, wherein the multiple data processors are programmed for storing, in the respective databases, signatures of the files of the file system having inode numbers within the specified ranges of inode numbers, wherein the inode numbers are primary keys to records of the file-specific information in the databases, and the signatures are secondary keys to the records of the file-specific information in the databases.

* * * * *